US011914062B2

(12) United States Patent
Rácz et al.

(10) Patent No.: US 11,914,062 B2
(45) Date of Patent: Feb. 27, 2024

(54) TECHNIQUE FOR CALIBRATING A POSITIONING SYSTEM

(71) Applicant: Telefonaktiebolaget LM Ericsson (publ), Stockholm (SE)

(72) Inventors: András Rácz, Budapest (HU); Tamas Borsos, Budapest (HU); Péter Hága, Budapest (HU); Peter Vaderna, Budapest (HU); András Veres, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 464 days.

(21) Appl. No.: 17/286,547

(22) PCT Filed: Oct. 23, 2018

(86) PCT No.: PCT/EP2018/078968
§ 371 (c)(1),
(2) Date: Apr. 19, 2021

(87) PCT Pub. No.: WO2020/083468
PCT Pub. Date: Apr. 30, 2020

(65) Prior Publication Data
US 2021/0349174 A1    Nov. 11, 2021

(51) Int. Cl.
*G01S 5/02*    (2010.01)
*G01S 5/12*    (2006.01)

(52) U.S. Cl.
CPC ............ *G01S 5/0242* (2013.01); *G01S 5/021* (2013.01); *G01S 5/12* (2013.01)

(58) Field of Classification Search
CPC .......... G01S 5/0242; G01S 5/021; G01S 5/12
(Continued)

(56) References Cited

U.S. PATENT DOCUMENTS 8,193,984 B2    6/2012    Ward
8,344,948 B2    1/2013    Hol et al.
(Continued)

OTHER PUBLICATIONS

International Search Report and Written Opinion dated Jul. 2, 2019 for International Application No. PCT/EP2018/078968 filed Oct. 23, 2018, consisting of 12—pages.

*Primary Examiner* — Harry K Liu
(74) *Attorney, Agent, or Firm* — Christopher & Weisberg, P.A.

(57) ABSTRACT

Calibrating a positioning system comprising a plurality of anchor nodes used to determine tag positions within a localization area using radio technology. The method includes performing, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area, estimating locations of the plurality of anchor nodes based on the respective first distances determined by the first ranging measurements and the respective first positions estimated by the first odometry measurements, and calibrating the positioning system using the estimated locations of the plurality of anchor nodes.

18 Claims, 9 Drawing Sheets

(58) Field of Classification Search
USPC .......................................................... 342/450
See application file for complete search history.

(56) References Cited

U.S. PATENT DOCUMENTS

| | | |
|---|---|---|
| 10,075,813 B1 * | 9/2018 | Struhsaker .............. H04L 67/12 |
| 2009/0212995 A1 | 8/2009 | Wu et al. |
| 2011/0170524 A1 | 7/2011 | Arslan et al. |
| 2014/0266916 A1 | 9/2014 | Pakzad et al. |
| 2015/0094081 A1 | 4/2015 | Gupta |
| 2016/0088584 A1 | 3/2016 | Kudekar et al. |

* cited by examiner

US 11,914,062 B2

TECHNIQUE FOR CALIBRATING A POSITIONING SYSTEM

CROSS-REFERENCE TO RELATED APPLICATIONS

This application is a Submission Under 35 U.S.C. § 371 for U.S. National Stage Patent Application of International Application Number: PCT/EP2018/078968, filed Oct. 23, 2018 entitled "TECHNIQUE FOR CALIBRATING A POSITIONING SYSTEM," the entirety of which is incorporated herein by reference.

TECHNICAL FIELD

The present disclosure generally relates to the field of positioning systems. In particular, a technique for calibrating a positioning system comprising a plurality of anchor nodes used to determine tag positions within a localization area using radio technology is presented. The technique may be embodied in methods, computer programs, apparatuses and systems.

BACKGROUND

In environments where positioning technologies such as the Global Positioning System (GPS) are unavailable or not accurate enough (e.g., in indoor environments), high precision positioning systems may be installed to allow object location detection with even a centimeter level of accuracy. High precision positioning systems may be based on Ultra Wideband (UWB) technology, for example, and typically comprise a fixedly deployed set of anchor nodes (e.g., installed on ceiling or walls) and a variable set of movable tag devices (e.g., attached to objects, such as to workpieces in a factory) and whose locations need to be determined.

An exemplary architecture of such system is illustrated in FIG. 1, where tag devices can communicate with anchor nodes using radio technology, e.g., using short signal pulses, to perform two-way timing measurements of the time the signals travel between a tag device and an anchor node to thereby measure the distance therebetween. This process is called "ranging". The position of the tag devices can be determined based on such ranging measurements, taking into consideration the known fixed coordinates of the anchor nodes. As shown in the figure, the ranging measurements performed between the anchor nodes and the tag devices may be delivered to a cloud (e.g., to a cloud based positioning service), where the positions of the tag devices can be calculated based on the ranging measurements. The cloud may then provide various services to upper layer applications available via respective Application Programming Interfaces (APIs) and provide the calculated positions of the tag devices for further processing, or send alerts when a tag device approaches a restricted area, for example.

Before the positioning system can be put into operation, the anchor nodes need to be deployed first and their exact position in the three-dimensional space needs to be configured in the system for calibration purposes. In the simplest case, the position of the anchor nodes may be measured manually with laser distance measuring devices and may be preconfigured in the system. However, such approach is generally cumbersome and may not always be feasible, e.g., when anchor nodes are installed at locations that are difficult to reach or not reachable at all (e.g., at certain portions of ceilings or walls). Other solutions try to simplify this process by collecting a large set of ranging measurements data and then calculating the most probable anchor positions that explain the collected data in the best possible way.

One such solution is disclosed in U.S. Pat. No. 8,344,948 B2 and involves collecting a first set of data by placing a tag device close to each anchor node and obtain a first rough estimate of the anchor node coordinates. In a second step, data may be collected by walking with the tag device in the measurement space and an optimization algorithm may be executed to estimate the most probable tag trajectory as well as the anchor node positions. The method assumes a model of the signal time of arrival measurements with Gaussian errors and the optimization is focused on estimating the model parameters. However, this method assumes "clean" measurements, i.e., line of sight only measurements, which requires some filtering beforehand and, further, the assumed model deals with Gaussian errors only which can be quite limiting and inaccurate in practice.

Another solution is disclosed in US 2015/0094081 A1 which is based on performing ranging measurements between access points and determining their relative coordinates based on these measurements. The process may be started off with three neighboring anchor nodes which mutually measure each other and, then, additional neighboring anchors may be added one-by-one, determining their positions based on the already selected anchors. In this method, measurements between anchor nodes may entail constant errors, e.g., originating from non-line of sight measurements, and the resulting anchor node coordinates may therefore be inaccurate as well.

As can be seen from these examples, current solutions for configuring the positions of anchor nodes for calibration purposes may either make infeasible assumptions that lead to inaccurate results (e.g., due to non-realistic assumptions, such as Gaussian errors, the availability of clean line of sight measurements only, or error-free anchor-to-anchor ranging) or may require infeasible measurement collections, such as the need to move tag devices close to the anchor nodes, which may be impossible when the anchor nodes are deployed at hardly reachable locations.

SUMMARY

Accordingly, there is a need for a technique which avoids one or more of the problems discussed above, or other problems.

According to a first aspect, a method for calibrating a positioning system comprising a plurality of anchor nodes used to determine tag positions within a localization area using radio technology is provided. The method is performed using a measurement device comprising at least one odometry sensor and a localization tag configured to communicate with the plurality of anchor nodes using the radio technology. The method comprises performing, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area, estimating locations of the plurality of anchor nodes based on the respective first distances determined by the first ranging measurements and the respective first positions estimated by the first odometry measurements, and configuring the positioning system with the estimated locations of the plurality of anchor nodes to calibrate the positioning system.

The first ranging measurements and the first odometry measurements may be performed periodically when moving the measurement device through the localization area. The respective first distances determined by the first ranging measurements and the respective first positions estimated by the first odometry measurements may be stored in a first measurement dataset, wherein, in the first measurement dataset, each position estimated by an odometry measurement may be stored in association with corresponding distances to visible anchor nodes determined by ranging measurements at the same measurement point. The respective first distances determined by the first ranging measurements and the respective first positions estimated by the first odometry measurements may be transferred from the measurement device to a server, wherein estimating the locations of the plurality of anchor nodes may be performed by the server. Transferring the respective first distances determined by the first ranging measurements and the respective first positions estimated by the first odometry measurements from the measurement device to the server may be performed batchwise while performing the first ranging measurements and the first odometry measurements.

Estimating the locations of the plurality of anchor nodes may include compensating drifts in the respective first positions estimated by the first odometry measurements. Compensating the drifts in the respective first positions estimated by the first odometry measurements may include at least one of rotating and scaling the respective first positions with respect to at least one known landmark position. Estimating the locations of the plurality of anchor nodes may include executing at least two location estimation algorithms having different characteristics with regard to error robustness, and combining the results of the at least two location estimation algorithms. The at least two location estimation algorithms may comprise a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements. A location of an anchor node may be estimated by determining a cluster head that is closest to the calculated crosspoints. The crosspoint based algorithm may further include filtering out crosspoints for which there are ranging measurements with a distance smaller than a distance between the respective crosspoint and a corresponding first position estimated by the first odometry measurements by a predetermined threshold. The at least two location estimation algorithms may also comprise an optimization algorithm which includes solving an optimization problem to optimally fit the locations of the plurality of anchor nodes with the first ranging measurements and the first odometry measurements. In the optimization algorithm, the respective first positions estimated by the first odometry measurements may be treated as known positions in the optimization problem.

The method may further comprise performing, at a plurality of second measurement points in the localization area using the localization tag, second ranging measurements with respect to the plurality of anchor nodes using the radio technology to determine respective second distances from the measurement device to the plurality of anchor nodes and performing, at the plurality of second measurement points using the at least one odometry sensor, second odometry measurements to estimate respective second positions of the measurement device in the localization area, and validating the estimated locations of the plurality of anchor nodes based on the second distances determined by the second ranging measurements and the second positions estimated by the second odometry measurements. Validating the estimated locations of the plurality of anchor nodes may be performed considering at least one of a number of undershoot measurements corresponding to a number of times one of the second distances is smaller than a distance between the associated second position and the estimated location of the corresponding anchor node being validated, a number of line of sight measurements corresponding to a number of times one of the second distances coincides with a distance between the associated second position and the estimated location of the corresponding anchor node being validated, and an angular distribution of the line of sight measurements in space.

When one or more of the estimated locations of the plurality of anchor nodes are validated negatively, the method may further comprise performing, at a plurality of third measurement points in the localization area using the localization tag, third ranging measurements with respect to the one or more negatively validated anchor nodes using the radio technology to determine respective third distances from the measurement device to the one or more negatively validated anchor nodes and performing, at the plurality of third measurement points using the at least one odometry sensor, third odometry measurements to estimate respective third positions of the measurement device in the localization area, and refining the estimated locations of the one or more negatively validated anchor nodes based on the respective third distances determined by the third ranging measurements and the respective third positions estimated by the third odometry measurements. The method may further comprise providing guidance for re-measuring the one or more negatively validated anchor nodes. Also, the method may further comprise providing feedback on whether the third ranging measurements correspond to line of sight measurements.

According to a second aspect, a measurement device for supporting calibration of a positioning system comprising a plurality of anchor nodes used to determine tag positions within a localization area using radio technology is provided. The measurement device comprises at least one odometry sensor and a localization tag configured to communicate with the plurality of anchor nodes using the radio technology. The measurement device is configured to perform the steps of performing, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area, and providing the respective first distances determined by the first ranging measurements and the respective first positions estimated by the first odometry measurements to a configuration component for calibration of the positioning system.

As in the method of the first aspect, the first ranging measurements and the first odometry measurements may be performed periodically when the measurement device is moved through the localization area. The respective first distances determined by the first ranging measurements and the respective first positions estimated by the first odometry measurements may be stored in a first measurement dataset, wherein, in the first measurement dataset, each position estimated by an odometry measurement may be stored in association with corresponding distances to visible anchor nodes determined by ranging measurements at the same measurement point. The configuration component may be executed on a server, wherein the respective first distances determined by the first ranging measurements and the respective first positions estimated by the first odometry measurements may be transferred from the measurement device to the configuration component. Transferring the respective first distances determined by the first ranging measurements and the respective first positions estimated by the first odometry measurements from the measurement device to the server may be performed batchwise while performing the first ranging measurements and the first odometry measurements.

The measurement device may further be configured to perform the steps of performing, at a plurality of second measurement points in the localization area using the localization tag, second ranging measurements with respect to the plurality of anchor nodes using the radio technology to determine respective second distances from the measurement device to the plurality of anchor nodes and performing, at the plurality of second measurement points using the at least one odometry sensor, second odometry measurements to estimate respective second positions of the measurement device in the localization area, and providing the respective second distances determined by the second ranging measurements and the respective second positions estimated by the second odometry measurements to the configuration component for calibration of the positioning system. Also, the measurement device may further be configured to perform the steps of performing, at a plurality of third measurement points in the localization area using the localization tag, third ranging measurements with respect to one or more negatively validated anchor nodes using the radio technology to determine respective third distances from the measurement device to the one or more negatively validated anchor nodes and performing, at the plurality of third measurement points using the at least one odometry sensor, third odometry measurements to estimate respective third positions of the measurement device in the localization area, and providing the respective third distances determined by the third ranging measurements and the respective third positions estimated by the third odometry measurements to the configuration component for calibration of the positioning system. The measurement device may further be configured to perform the step of providing guidance for re-measuring the one or more negatively validated anchor nodes. Also, the measurement device may further be configured to perform the step of providing feedback on whether third ranging measurements correspond to line of sight measurements.

According to a third aspect, a configuration component for supporting calibration of a positioning system comprising a plurality of anchor nodes used to determine tag positions within a localization area using radio technology is provided. The configuration component is configured to perform the steps of obtaining, from a measurement device, respective first distances from the measurement device to the plurality of anchor nodes determined by first ranging measurements performed by the measurement device at a plurality of first measurement points in the localization area using a localization tag of the measurement device, and respective first positions of the measurement device in the localization area estimated by first odometry measurements performed by the measurement device at the plurality of first measurement points using at least one odometry sensor of the measurement device, estimating locations of the plurality of anchor nodes based on the respective first distances determined by the first ranging measurements and the respective first positions estimated by the first odometry measurements, and configuring the positioning system with the estimated locations of the plurality of anchor nodes to calibrate the positioning system.

As in the method of the first aspect, estimating the locations of the plurality of anchor nodes may include compensating drifts in the respective first positions estimated by the first odometry measurements. Compensating the drifts in the respective first positions estimated by the first odometry measurements may include at least one of rotating and scaling the respective first positions with respect to at least one known landmark position. Estimating the locations of the plurality of anchor nodes may include executing at least two location estimation algorithms having different characteristics with regard to error robustness, and combining the results of the at least two location estimation algorithms. The at least two location estimation algorithms may comprise a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements. A location of an anchor node may be estimated by determining a cluster head that is closest to the calculated crosspoints. The crosspoint based algorithm may further include filtering out crosspoints for which there are ranging measurements with a distance smaller than a distance between the respective crosspoint and a corresponding first position estimated by the first odometry measurements by a predetermined threshold. The at least two location estimation algorithms may also comprise an optimization algorithm which includes solving an optimization problem to optimally fit the locations of the plurality of anchor nodes with the first ranging measurements and the first odometry measurements. In the optimization algorithm, the respective first positions estimated by the first odometry measurements may be treated as known positions in the optimization problem.

The configuration component may further be configured to perform the steps of obtaining, from the measurement device, respective second distances from the measurement device to the plurality of anchor nodes determined by second ranging measurements performed by the measurement device at a plurality of second measurement points in the localization area using the localization tag of the measurement device with respect to the plurality of anchor nodes, and respective second positions of the measurement device in the localization area estimated by second odometry measurements performed by the measurement device at the plurality of second measurement points using at least one odometry sensor of the measurement device, and validating the estimated locations of the plurality of anchor nodes based on the second distances determined by the second ranging measurements and the second positions estimated by the second odometry measurements. Validating the estimated locations of the plurality of anchor nodes may be performed considering at least one of a number of undershoot measurements corresponding to a number of times one of the second distances is smaller than a distance between the associated second position and the estimated location of the corresponding anchor node being validated, a number of line of sight measurements corresponding to a number of times one of the second distances coincides with a distance between the associated second position and the estimated location of the corresponding anchor node being validated, and an angular distribution of the line of sight measurements in space.

When one or more of the estimated locations of the plurality of anchor nodes are validated negatively, the configuration component may further be configured to perform the steps of obtaining, from the measurement device, respective third distances from the measurement device to the plurality of anchor nodes determined by third ranging measurements performed by the measurement device at a plurality of third measurement points in the localization area using the localization tag of the measurement device with respect to the one or more negatively validated anchor nodes, and respective third positions of the measurement device in the localization area estimated by third odometry measurements performed by the measurement device at the plurality of third measurement points using at least one odometry sensor of the measurement device, and refining the estimated locations of the one or more negatively validated anchor nodes based on the respective third distances determined by the third ranging measurements and the respective third positions estimated by the third odometry measurements.

According to a fourth aspect, a computer program product is provided. The computer program product comprises program code portions for performing the steps specified in at least one of the second aspect and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, there is provided a system comprising a measurement device according to the second aspect and a configuration component according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
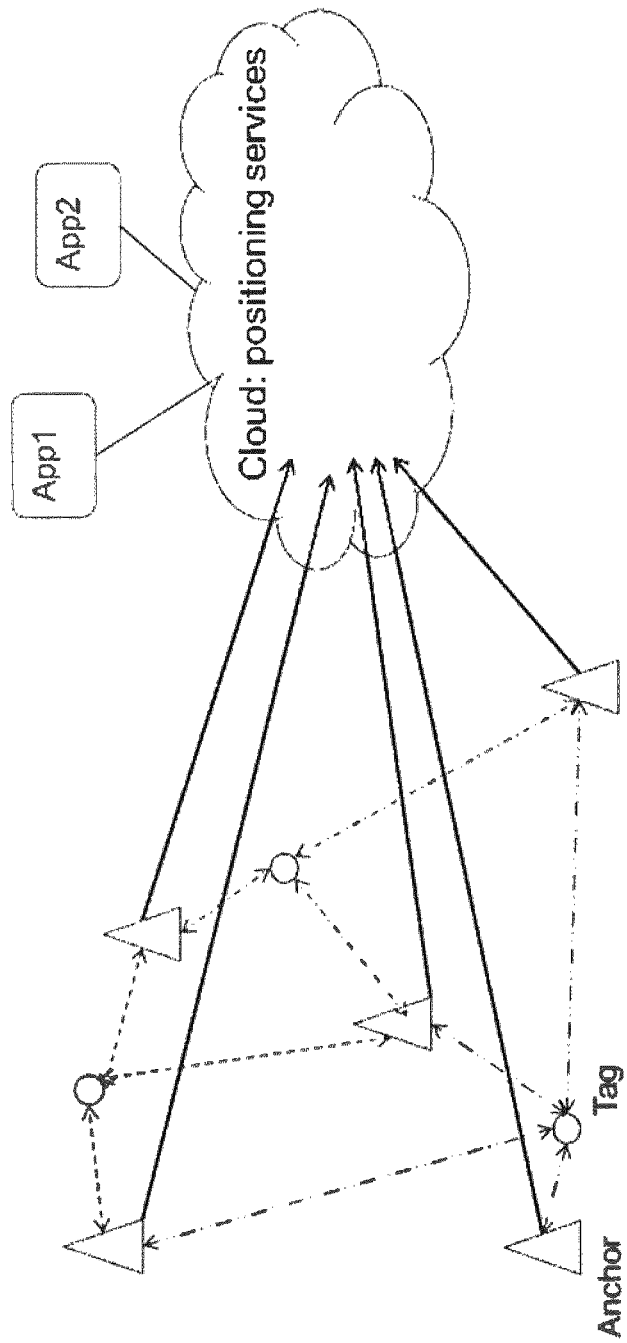
FIG. 1 illustrates an exemplary architecture of a positioning system comprising anchor nodes and tag devices in a localization area, wherein a cloud based positioning service determines the positions of the tag devices based on ranging measurements performed between the anchor nodes and the tag devices.
Figure 2:
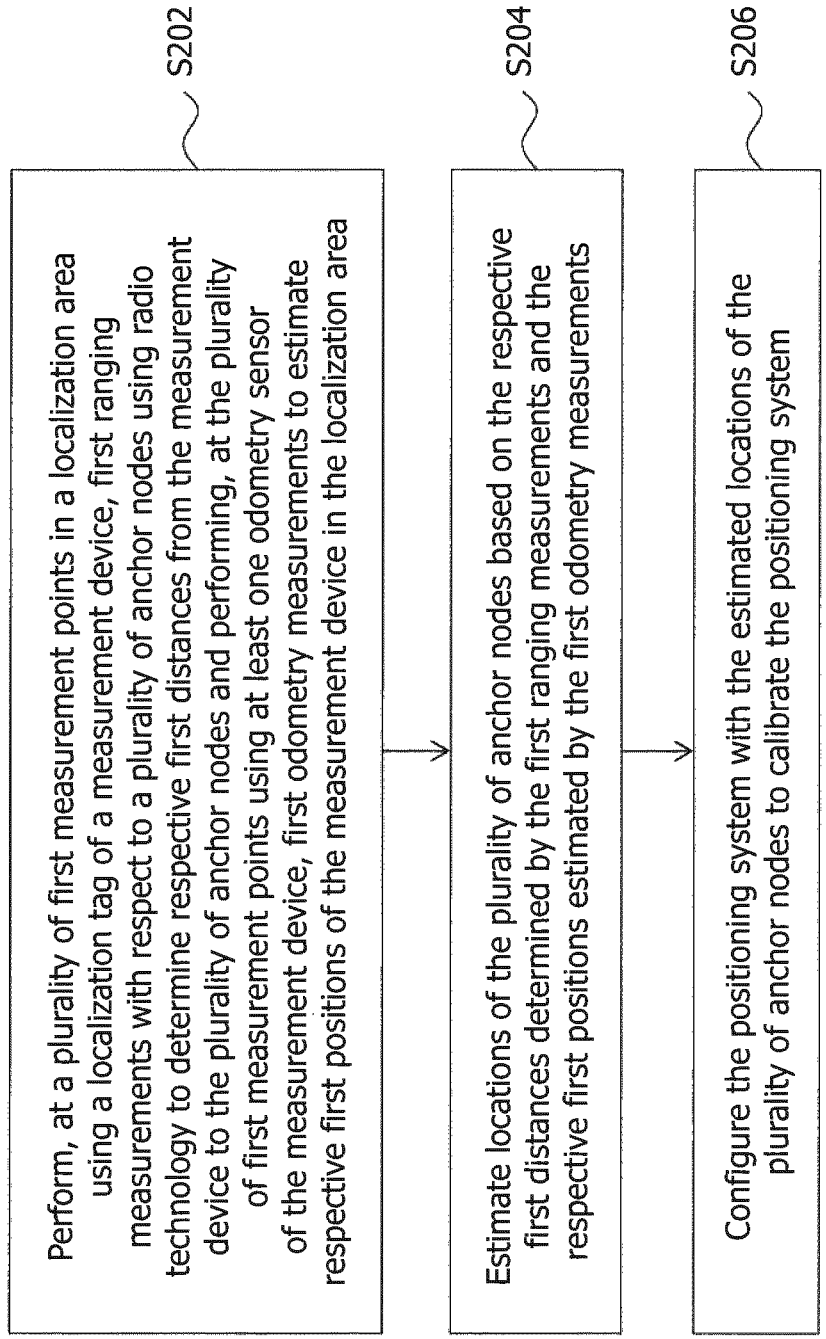
FIG. 2 illustrates a method for calibrating a positioning system according to the present disclosure.

FIG. 2 illustrates a method for calibrating a positioning system according to the present disclosure. The positioning system comprises a plurality of anchor nodes used to determine tag positions within a localization area using radio technology. The method is performed using a measurement device comprising at least one odometry sensor and a localization tag configured to communicate with the plurality of anchor nodes using the radio technology. The method comprises performing, in step S202, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area. The method further comprises estimating, in step S204, locations of the plurality of anchor nodes based on the respective first distances determined by the first ranging measurements and the respective first positions estimated by the first odometry measurements and, in step S206, configuring the positioning system with the estimated locations of the plurality of anchor nodes to calibrate the positioning system.

Figure 3:
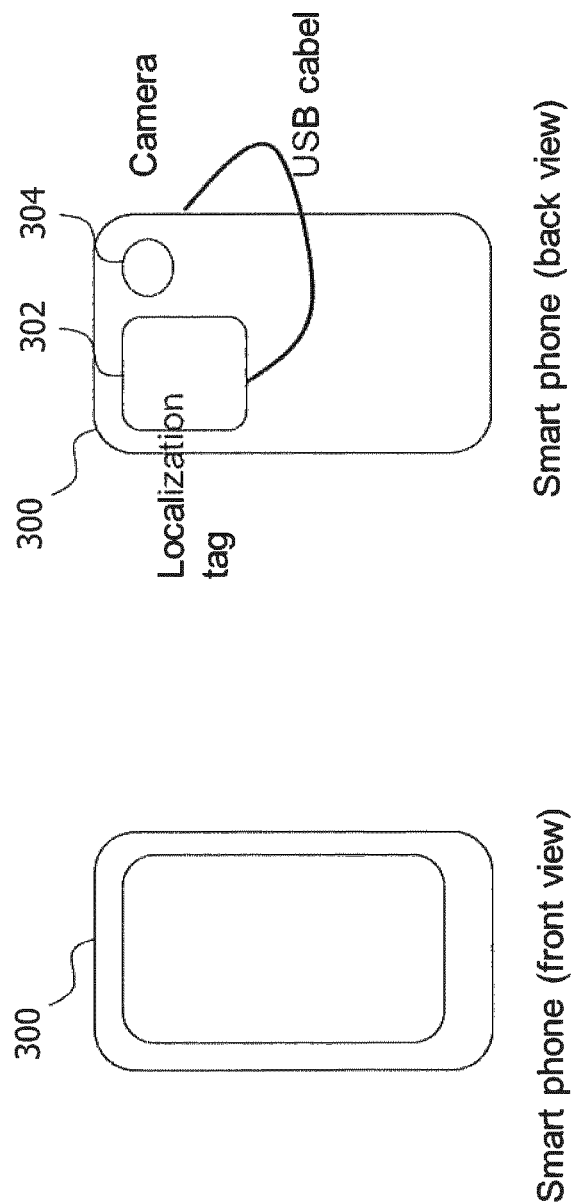
FIG. 3 illustrates an exemplary measurement device according to the present disclosure.

To perform calibration measurements, a measurement device may thus be employed which includes both at least one odometry sensor and a localization tag that is configured to communicate with the plurality of anchor nodes using the radio technology. The localization tag may correspond to a tag device described above for systems of the prior art. The radio technology may be UWB technology, for example. The measurement device may be provided in the form of a portable device, such as a smart phone or tablet, for example, that may be carried through the localization area to perform the calibration procedure. As known to the person skilled in the art, odometry generally relates to the use of data from motion sensors to estimate a change in position over time (e.g., relative to a start position). The at least one odometry sensor may thus comprise at least one sensor capable to measure a movement of the measurement device in the three-dimensional space and may include a camera, an inertial sensor or a depth sensor, for example. Odometry measurements may relate to relative movements of the measurement device determined by the at least one odometry sensor. The localization tag may be mounted on the measurement device in such a way that the localization tag is as close as possible to (e.g., adjacent to) the at least one odometry sensor and that its relative position to the at least one odometry sensor is fixed. An exemplary measurement device is illustrated in FIG. 3, where the device is provided in the form of a smart phone 300 with a localization tag 302 mounted next to the camera 304 of the smart phone 300 and where the localization tag 302 is connected to the smart phone via a USB connection.

The localization area may correspond to the area that is coverable by the radio range of the plurality of anchor nodes, i.e., the area in which the plurality of anchor nodes may perform ranging measurements with localization tags using the radio technology. Each of the plurality of anchor nodes may be configured to communicate with localization tags in the localization area using the radio technology and, more specifically, perform ranging measurements with respect to localization tags in the localization area using the radio technology. The positioning system may be configured to locate the localization tags in the localization area based on the ranging measurements performed between the plurality of anchor nodes and the localization tags.

For calibration purposes, the measurement device may be moved through the localization area along a measurement path (e.g., a random walk) which includes the plurality of first measurement points, wherein, at each of the plurality of first measurement points, a ranging measurement may be performed with respect to the plurality of anchor nodes using the radio technology to determine a corresponding distance from the measurement device (more specifically, from the localization tag of the measurement device) to each (visible) anchor node among the plurality of anchor nodes at that measurement point, resulting in the "respective first distances" determined by the "first ranging measurements" in step S202 mentioned above. In order to obtain more accurate measurement data for the calibration of the positioning system, odometry measurements may be performed—in addition to the ranging measurements—at the same measurement points in the measurement path.

Figure 4:
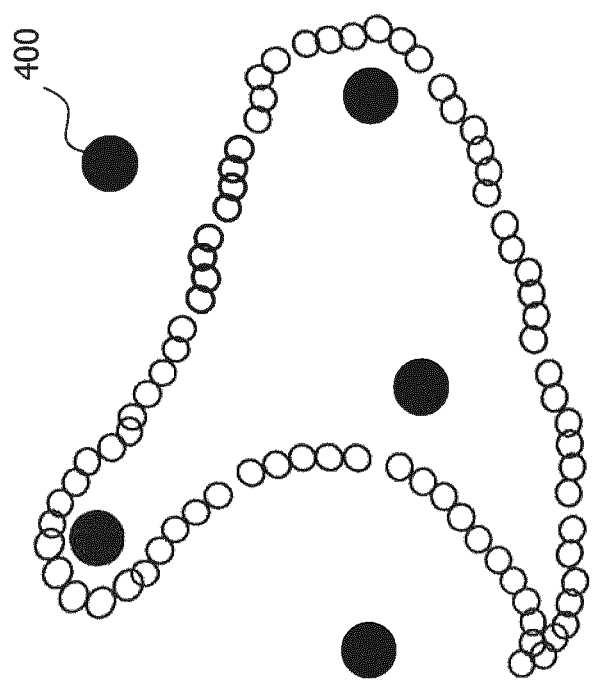
FIG. 4 illustrates an exemplary measurement path along which a measurement device may be moved in a localization area.

That is, at each of the plurality of first measurement points, an odometry measurement may be performed in addition to the ranging measurement to estimate a corresponding position of the measurement device in the localization area at that measurement point, resulting in the "respective first positions" determined by the "first odometry measurements" in step S202 mentioned above. An exemplary measurement path through the localization area made up by a plurality of anchor nodes 400 is illustrated in FIG. 4, where the small circles represent the estimated positions (with some uncertainty) of the measurement device being carried along the random walk.

Before the measurement procedure is started, at least one synchronization landmark whose exact position is known may be designated. This may be a corner point or the position of a special object, for example. The coordinates of such landmarks in the three-dimensional space may be manually preconfigured or read out of a map, for example. As the measurement device is carried through the localization area and reaches a synchronization landmark, the measurement device may be placed as close as possible to the landmark to record the position of the landmark (e.g., by pushing a "landmark button" on the smart phone 300 to indicate that a known position has been reached). Such recording of landmarks may later be helpful in compensating drifts in the odometry measurements, as will be described in more detail below.

As the measurement device is carried through the localization area, the first ranging measurements and the first odometry measurements may be performed continuously (e.g., periodically), wherein the results of the first ranging measurements and the first odometry measurements may be recorded on the measurement device (e.g., logged into a log file). The first ranging measurements and the first odometry measurements may thus be performed periodically when moving the measurement device through the localization area and, further, the respective first distances determined by the first ranging measurements and the respective first positions estimated by the first odometry measurements may be stored in a first measurement dataset, wherein, in the first measurement dataset, each position estimated by an odometry measurement may be stored in association with corresponding distances to visible anchor nodes (among the plurality of anchor nodes) determined by ranging measurements at the same measurement point. In other words, the first odometry measurements may be combined with the first ranging measurements obtained from the localization tag, such that each odometry measurement is combined with the next (or previous) ranging measurement (e.g., which is closest in time) in the measurement dataset. In still in other words, each measurement point may have an associated range measurement vector that includes all anchor nodes visible and measured at that measurement point. The measurement dataset may be populated as the measurement device is moved through the localization area, e.g., by logging the respective measurements into the log file and storing the file accordingly. All this behavior of the measurement device may realized by a measurement collection software executed on the measurement device, e.g., in accordance with a preset configuration.

Based on the determined first distances and the estimated first positions, the locations of the plurality of anchor nodes may be estimated in step S204 and the positioning system may be configured with the estimated locations of the plurality of anchor nodes to calibrate the positioning system in the step S206, as described above. While it is generally conceivable that these steps are performed by the measurement device itself, it may also be conceivable that at least one of these steps is performed remotely from the measurement device. To this end, the respective first distances determined by the first ranging measurements and the respective first positions estimated by the first odometry measurements may be transferred (or "provided") from the measurement device to a server, wherein estimating the locations of the plurality of anchor nodes may then be performed by the server. The server may reside in a cloud, for example. A configuration component executed on the server may receive (or "obtain") the respective first distances and the respective first positions from the measurement device and may process them in line with steps S204 and S206.

While the measurement dataset recorded by the measurement device may be transferred to the server after the generation of the measurement dataset is complete (e.g., upload the complete log file to the server when the random walk in the localization area with the measurement device is finished), the transfer may also be performed in smaller batches while the measurement procedure is still ongoing. In other words, transferring the respective first distances determined by the first ranging measurements and the respective first positions estimated by the first odometry measurements from the measurement device to the server may be performed batchwise while performing the first ranging measurements and the first odometry measurements. In this way, a user of the measurement device may get continuous feedback from the server about current best anchor position estimates as well as hints as to which estimated anchor node location still requires a more precise measurement, so that the measurement device can be carried to those "white spots" in a targeted way. This will be described in more detail below with reference to the validation procedure.

For the purpose of estimating the locations of the plurality of anchor nodes in accordance with step S204, possible drifts in the odometry measurements may be compensated by matching measurement samples around a synchronization landmark to the exact known position of the landmark. Estimating the locations of the plurality of anchor nodes may thus include compensating drifts in the respective first positions estimated by the first odometry measurements. This may include a rotation and/or scaling of all odometry measurement points on the measurement path such that the measurement points around the landmarks exactly fit the known positions of the landmarks. Compensating the drifts in the respective first positions estimated by the first odometry measurements may thus include at least one of rotating and scaling the respective first positions with respect to at least one known landmark position.

The first ranging measurements and the (optionally, drift compensated) first positions may then be input to an anchor node location estimation algorithm. While it will be understood that various algorithms can be used to calculate the anchor node positions, in one particular implementation, estimating the locations of the plurality of anchor nodes may include executing at least two location estimation algorithms having different characteristics with regard to error robustness, and combining the results of the at least two location estimation algorithms. In particular, one of these estimation algorithms may be robust against one type of errors while, while another estimation algorithm may be robust against another type of errors, to thereby minimize the error of the combined procedure. Also, other than the prior art systems described above, the estimation algorithms may take no a-priori assumptions about error models or line of sight/non-line of sight measurements, for example.

Figure 5B:
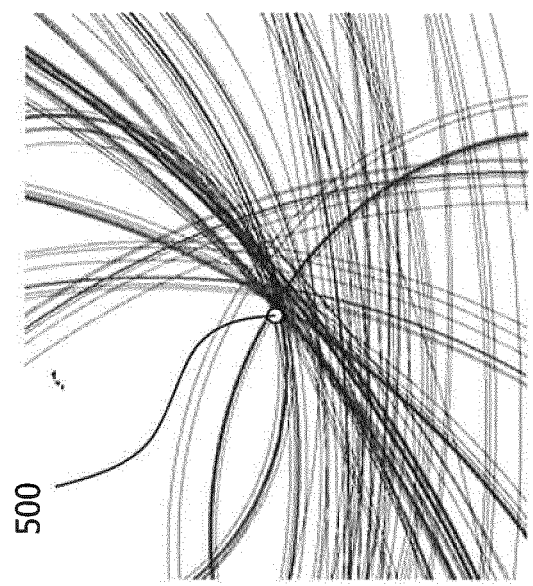
FIGS. 5a and 5b illustrate exemplary crosspoints of spheres and a corresponding cluster head calculated as part of a crosspoint based algorithm according to the present disclosure.
Figure 5A:
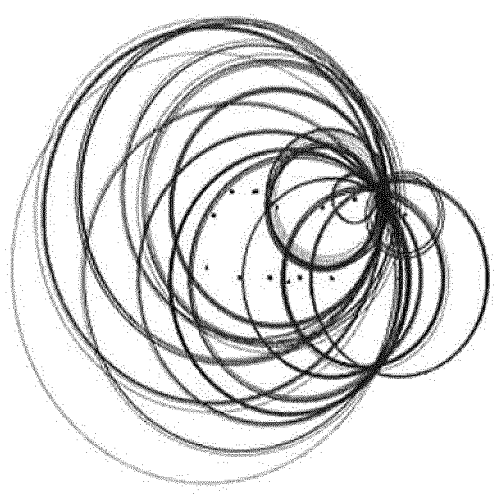

In one variant, the at least two location estimation algorithms may comprise a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements. In other words, the crosspoint based algorithm may include calculating crosspoints of spheres taken around the measurement points with the ranging measurements representing the radii, wherein crosspoints of spheres are taken as potential anchor node positions. An exemplary illustration of such a scenario is illustrated in FIG. 5a. A location of an anchor node may then be estimated by determining a cluster head that is closest to the calculated crosspoints. Such situation is shown in FIG. 5b, where the cluster head 500 is determined to be closest to all calculated crosspoints for a particular anchor node so that the cluster head 500 is assumed as the exact location of that anchor node.

As there may be a large number of spheres and crosspoints, a filtering operation may be applied such that crosspoints that are in conflict with any ranging measurement are removed. The crosspoint based algorithm may thus further include filtering out crosspoints for which there are ranging measurements with a distance smaller than a distance between the respective crosspoint and a corresponding first position estimated by the first odometry measurements by a predetermined threshold. In other words, filtering criteria may be based on filtering out a crosspoint if there is a ranging measurement whose measured distance is smaller than the distance between the corresponding measurement point and the investigated crosspoint by someone threshold. This logic may generally be based on the assumption that there are no undershoot measurements, i.e., that the measured range is always greater than or equal to the actual distance (e.g., due to reflections or other effects which may increase the path traveled by the measurement signal). After performing the filtering, only feasible crosspoints may remain, representing a small and concentrated set of crosspoints from which the algorithm may choose a cluster head as described above, e.g., using a clustering algorithm or an optimization algorithm to determine the cluster head that is closest to all the possible crosspoints.

The at least two location estimation algorithms may also comprise an optimization algorithm which includes solving an optimization problem to optimally fit the locations of the plurality of anchor nodes with the first ranging measurements and the first odometry measurements. Such algorithm may be seen as a fundamentally different approach to the crosspoint filtering algorithm because it may try to find the anchor node positions as well as the measurement point positions as a large optimization problem such that the estimated positions fit the measurements in the best possible way. Here, not only the anchor node positions may be treated as unknown, but also the measurement point positions (i.e., the odometry positions). However, in order to increase the algorithm convergence time and accuracy, the odometry measurements may be treated as known positions. In the optimization algorithm, the respective first positions estimated by the first odometry measurements may thus be treated as known positions in the optimization problem. It will be understood that a "known" position may here have the meaning that the algorithm may take into account a certain +/− margin (or error range) as uncertainty regarding the measured odometry positions.

Once the locations of the plurality of anchor nodes have been estimated according to the procedure described above, the estimated locations may further be subjected to a validation procedure. The validation procedure may be performed as part of step S204, for example. To this end, a new set of ranging and odometry measurements may be collected in the localization area for validation purposes. The method may thus further comprise performing, at a plurality of second measurement points in the localization area using the localization tag, second ranging measurements with respect to the plurality of anchor nodes using the radio technology to determine respective second distances from the measurement device to the plurality of anchor nodes and performing, at the plurality of second measurement points using the at least one odometry sensor, second odometry measurements to estimate respective second positions of the measurement device in the localization area, and validating the estimated locations of the plurality of anchor nodes based on the second distances determined by the second ranging measurements and the second positions estimated by the second odometry measurements. The plurality of second measurement points may be different from the plurality of first measurement points and, more specifically, the second measurement dataset may be collected independently from the first measurement dataset. On the other hand, the second measurement dataset may be processed in the same manner as the first measurement dataset (e.g., transferred from measurement device to the server, etc.). In particular, the second measurement dataset may be subjected to the same drift compensation as the first measurement dataset, for example.

Validating the estimated locations of the plurality of anchor nodes may include checking whether the locations of the plurality of anchor nodes which are estimated based on the second distances and the second positions confirm the locations of the plurality of anchor nodes which are estimated based on the first distances and the first positions. For an anchor node, the estimated location may be considered to be confirmed when the corresponding location that is estimated based on the second distances and the second positions equals or is within a predefined distance threshold to the corresponding location that is estimated based on the first distances and first positions. Additionally or alternatively, in order to assess whether an estimated location is confirmed, a number of other metrics may be taking into consideration. For example, validating the estimated locations of the plurality of anchor nodes may be performed considering at least one of a number of undershoot measurements corresponding to a number of times one of the second distances is smaller than a distance between the associated second position and the estimated location of the corresponding anchor node being validated, a number of line of sight measurements corresponding to a number of times one of the second distances coincides with a distance between the associated second position and the estimated location of the corresponding anchor node being validated (this metric may be calculated for both the original measurements and for the validation set), and an angular distribution of the line of sight measurements in space (this may indicate whether the validated anchor node has been measured evenly from all main directions; e.g., the space may be divided into four regions and it may be calculated from which region a given ranging measurement comes from). Based on these metrics, assessing whether an estimated location is confirmed may be performed by checking whether at least one of these metrics is above or below a corresponding predefined threshold. If an estimated location is confirmed following any of the above rules, the estimated location may be said to be positively validated. Otherwise, the estimated location may be said to be negatively validated.

If an estimated location of an anchor node is negatively validated, the anchor node may be declared to be unreliable and a corresponding indication may be provided (e.g., via the measurement device). The measurement procedure may then be repeated for the negatively validated anchor nodes to refine their estimated coordinates. Thus, when one or more of the estimated locations of the plurality of anchor nodes are validated negatively, the method may further comprise performing, at a plurality of third measurement points in the localization area using the localization tag, third ranging measurements with respect to the one or more negatively validated anchor nodes using the radio technology to determine respective third distances from the measurement device to the one or more negatively validated anchor nodes and performing, at the plurality of third measurement points using the at least one odometry sensor, third odometry measurements to estimate respective third positions of the measurement device in the localization area, and refining the estimated locations of the one or more negatively validated anchor nodes based on the respective third distances determined by the third ranging measurements and the respective third positions estimated by the third odometry measurements. Similar to the second measurement dataset, the thus determined third measurement data set may be processed in the same manner as described above for the first measurement data set (e.g., transferred from the measurement device to the server, etc.). In particular, the third measurement data set may be subjected to the same drift compensation as the first measurement dataset, for example.

As part of the repeated measurement procedure, a user may be given indications which positions are problematic and which anchor nodes should thus be re-measured. To this end, the method may further comprise providing guidance for re-measuring the one or more negatively validated anchor nodes. Also, feedback on whether or not measurements are line of sight from a given location may be provided to the user. The method may thus also comprise providing feedback on whether the third ranging measurements correspond to line of sight measurements. A user may in this way be enabled to move the measurement device in such a way that line of sight is reached.

Figure 6A:
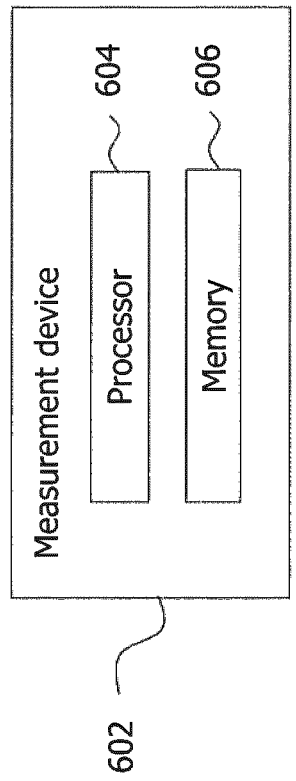
FIGS. 6a and 6b illustrate exemplary compositions of a measurement device and a configuration component according to the present disclosure.

FIG. 6a schematically illustrates an exemplary partial composition of the measurement device described above. The measurement device 602 may comprise at least one processor 604 and at least one memory 606, wherein the at least one memory 606 may contain instructions executable by the at least one processor 604 such that the measurement device 602 is operable to carry out the method steps described above in relation to the measurement device.

Figure 6B:
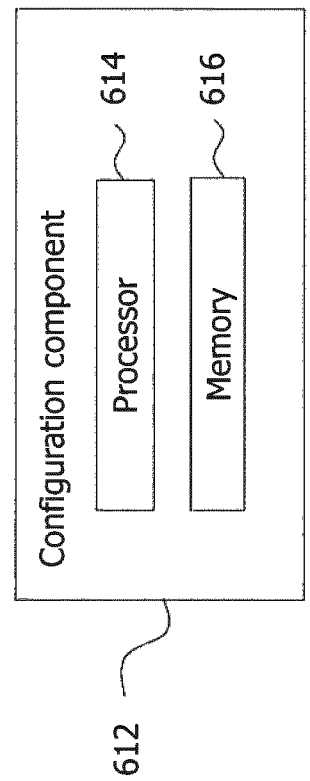

FIG. 6b schematically illustrates an exemplary partial composition of the configuration component mentioned above. As said, the configuration component may (but does not necessarily have to) be executed on a server. The configuration component 612 may comprise at least one processor 614 and at least one memory 616, wherein the at least one memory 616 may contain instructions executable by the at least one processor 614 such that the configuration component 612 is operable to carry out the method steps described above in relation to the configuration component (or the server). It will be understood that, if the configuration component 612 is implemented on a server remotely from the measurement device, the configuration component 612 may be implemented on a physical computing unit or a virtualized computing unit, such as a virtual machine, for example. It will further be appreciated that the configuration component 612 may not necessarily be implemented on a standalone computing unit, but may be implemented as components—realized in software and/or hardware—residing on multiple distributed computing units as well, such as in a cloud computing environment, for example.

Figure 7:
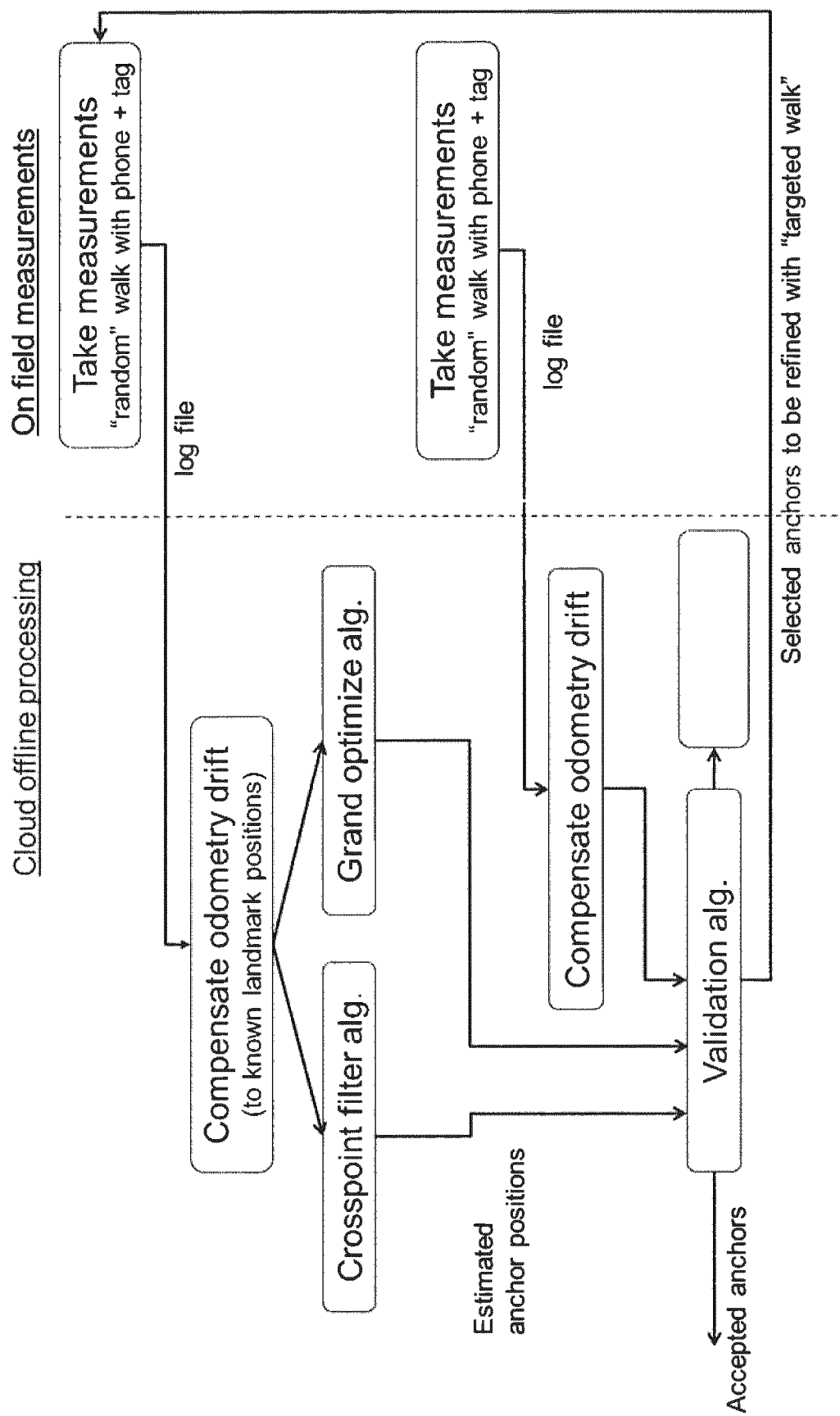
FIG. 7 illustrates a flowchart of an exemplary calibration procedure according to the present disclosure.

FIG. 7 illustrates a flowchart of an exemplary calibration procedure which is based on the method described above. The left portion of the figure illustrates steps of the method that are performed in a cloud (e.g., in an offline manner) and the right portion of the figure illustrates the steps of the method that are performed in the field using the measurement device. As an exemplary implementation of the measurement device, the calibration procedure may be performed using the smart phone 300, for example. As can be seen in the figure, in an initial step, measurements are collected in the field by taking random walks in the localization area, and software that runs on the phone continuously logs ranging measurements as well as odometry measurements. When the measurement collection is completed, the log file is uploaded from the phone to the cloud, where any drifts in the odometry measurements are compensated by matching odometry positions with known landmark positions. Next, two anchor location estimation algorithms are executed in parallel, wherein each of the algorithms is robust for a different type of error to minimize the error of the procedure. The output of the algorithms is then combined and the resulting coordinates are taken as the estimated locations of the anchor nodes. In order to validate the estimated locations, a new set of field measurements is collected in the field and uploaded as well as drift compensated in the same manner as in the first step. The validation is performed to assess whether the independently collected new data set confirms the previously estimated positions of the anchor nodes. If the new measurements confirm the anchor node coordinates, they are accepted and, if there are anchor nodes for which the estimated coordinates and the validation measurements are in conflict, the whole procedure is re-run (but only for those selected anchor nodes).

Figure 8:
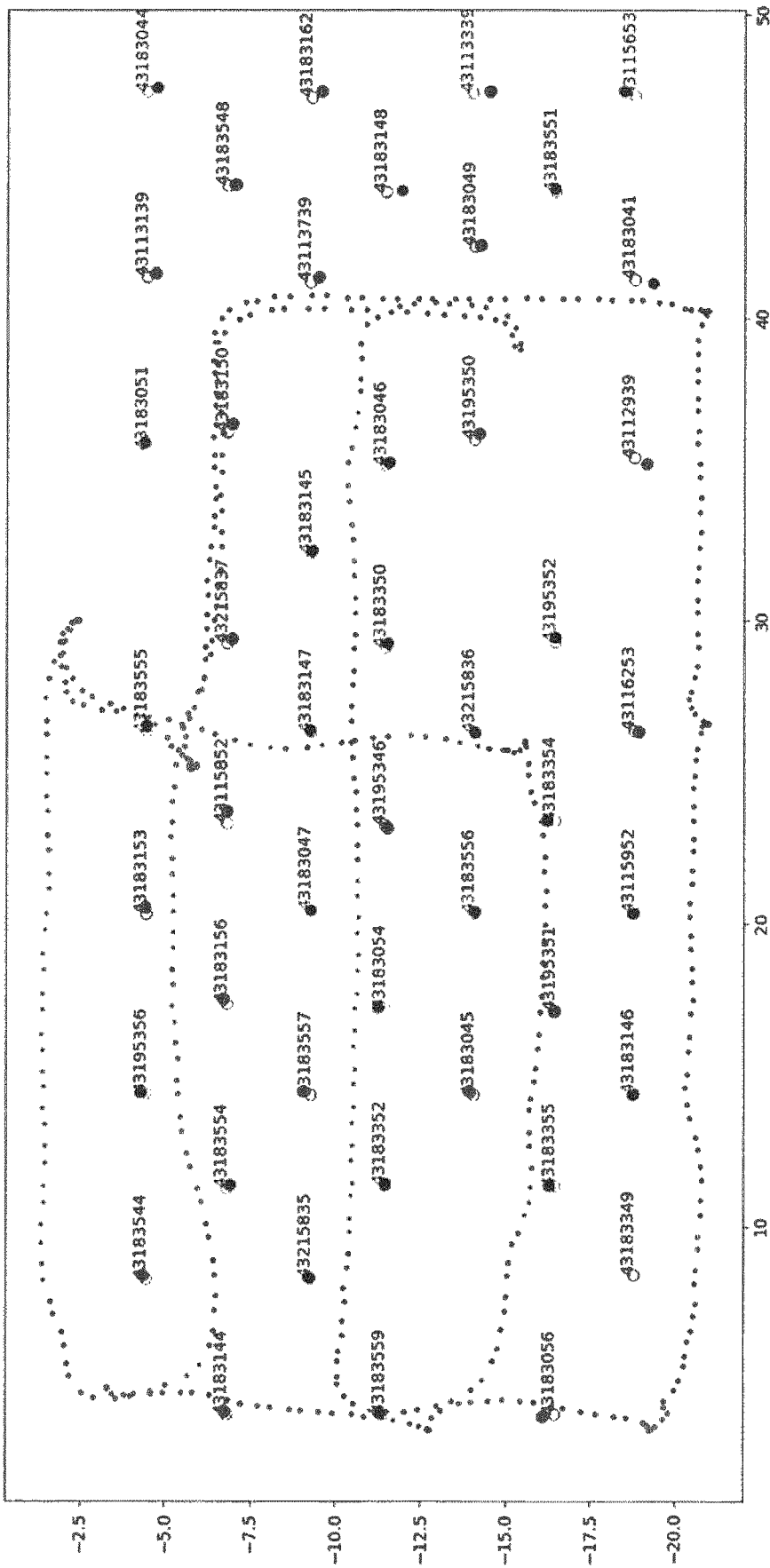
FIG. 8 illustrates a result of the calibration procedure for an actual deployment according to the present disclosure.

An exemplary result of the calibration procedure is shown in FIG. 8 for an actual deployment. In the figure, filled circles represent the estimated anchor node positions and unfilled circles represent true anchor node positions. Further, dots indicate the walking path where the measurements have been collected using the measurement device. As can be seen in figure, anchor nodes that have been visited on the measurement path "sufficiently well" (e.g., quantifyable in the validation step) all show a good and accurate estimation of the anchor node positions, while slight deviations appear in the estimated locations of anchor nodes which have not been visited closely on the measurement path.

Figure 9:
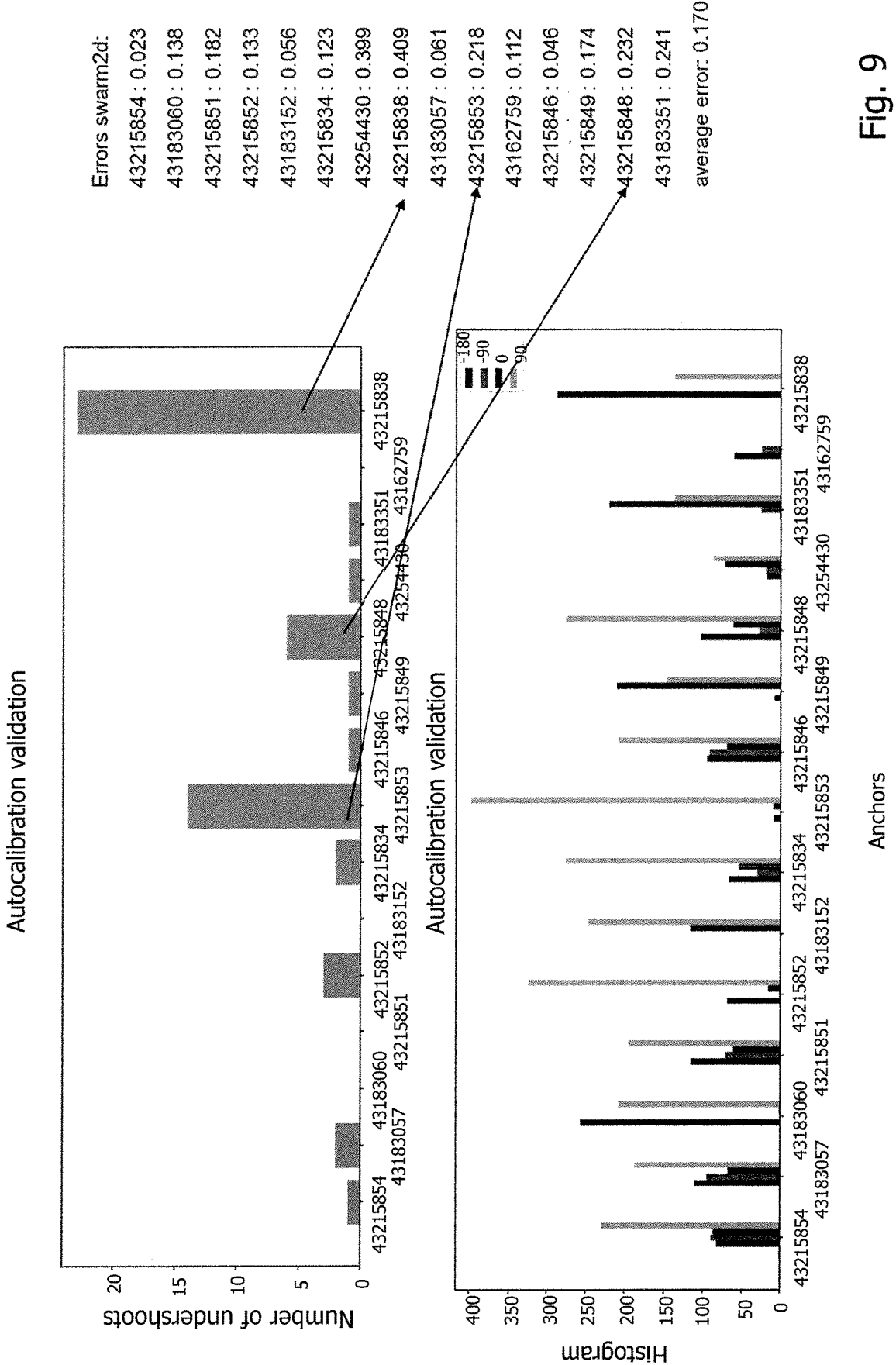
FIG. 9 illustrates exemplary validation statistics obtained for an actual deployment according to the present disclosure.

FIG. 9 illustrates an example of the validation statistics obtained for an actual deployment. The upper diagram in the figure shows the number of undershoot measurements per anchor node and the lower diagram in the figure shows the distribution for four measurements directions (i.e., −180, −90, 0, 90 degrees) corresponding to the angular distribution of the line of sight measurements in space. As can be seen in the upper diagram, for example, the number of undershoot measurements indicator coincides well with the true anchor position errors so that it may be concluded that a higher indicator value provides an indication for a higher error.

As has become apparent from the above, the present disclosure provides a technique for calibrating a positioning system which makes use of a measurement device that integrates both a localization tag and at least one odometry device in order to provide a more accurate measurement collection when taking random walk measurements in the localization area for calibration purposes. Due to the combined device, the trajectory may be known with improved accuracy. By then executing at least two different algorithms for the purpose of estimating the position of the anchor nodes, wherein one algorithm is robust against one type of errors while the other is robust against another type of errors, the algorithms are more robust in the sense that they are not required to make any assumptions about hidden models, line of sight or non-line of sight characteristics of the measurements being performed. The validation procedure may then be executed by collecting a new measurement set and determining the goodness of the estimated anchor node positions and, when necessary, this procedure may involve reiterating the whole process for problematic anchor nodes. The validation may give hints on where and how to collect more measurements to refine inaccurate anchor node coordinates. In other words, the validation may iteratively improve the calibration while providing guidance as to where and how to collect more measurements. In sum, the presented technique may provide a convenient and semi-automatic solution for the anchor configuration problem.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for calibrating a positioning system comprising a plurality of anchor nodes used to determine tag positions within a localization area using radio technology, the method being performed using a measurement device comprising at least one odometry sensor and a localization tag configured to communicate with the plurality of anchor nodes using the radio technology, the method comprising:
   performing, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area;
   estimating locations of the plurality of anchor nodes based on the respective first distances determined by the first ranging measurements and the respective first positions estimated by the first odometry measurements, estimating the locations of the plurality of anchor nodes including:
     executing at least two location estimation algorithms having different characteristics with regard to error robustness; and
     combining the results of the at least two location estimation algorithms; and
   configuring the positioning system with the estimated locations of the plurality of anchor nodes to calibrate the positioning system; and
   the at least two location estimation algorithms comprising a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements.

2. The method of claim 1, wherein the first ranging measurements and the first odometry measurements are performed periodically when moving the measurement device through the localization area.

3. The method of claim 1, wherein the respective first distances determined by the first ranging measurements and the respective first positions estimated by the first odometry measurements are stored in a first measurement dataset, wherein, in the first measurement dataset, each position estimated by an odometry measurement is stored in association with corresponding distances to visible anchor nodes determined by ranging measurements at the same measurement point.

4. The method of claim 1, wherein the respective first distances determined by the first ranging measurements and the respective first positions estimated by the first odometry measurements are transferred from the measurement device to a server, wherein estimating the locations of the plurality of anchor nodes is performed by the server.

5. The method of claim 4, wherein transferring the respective first distances determined by the first ranging measurements and the respective first positions estimated by the first odometry measurements from the measurement device to the server is performed batchwise while performing the first ranging measurements and the first odometry measurements.

6. The method of claim 1, wherein a location of an anchor node is estimated by determining a cluster head that is closest to the calculated crosspoints.

7. The method of claim 1, wherein the crosspoint based algorithm further includes filtering out crosspoints for which there are ranging measurements with a distance smaller than a distance between the respective crosspoint and a corresponding first position estimated by the first odometry measurements by a predetermined threshold.

8. The method of claim 1, further comprising:
performing, at a plurality of second measurement points in the localization area using the localization tag, second ranging measurements with respect to the plurality of anchor nodes using the radio technology to determine respective second distances from the measurement device to the plurality of anchor nodes and performing, at the plurality of second measurement points using the at least one odometry sensor, second odometry measurements to estimate respective second positions of the measurement device in the localization area; and
validating the estimated locations of the plurality of anchor nodes based on the second distances determined by the second ranging measurements and the second positions estimated by the second odometry measurements.

9. The method of claim 8, wherein validating the estimated locations of the plurality of anchor nodes is performed considering at least one of:
a number of undershoot measurements corresponding to a number of times one of the second distances is smaller than a distance between the associated second position and the estimated location of the corresponding anchor node being validated;
a number of line of sight measurements corresponding to a number of times one of the second distances coincides with a distance between the associated second position and the estimated location of the corresponding anchor node being validated; and
an angular distribution of the line of sight measurements in space.

10. A measurement device for supporting calibration of a positioning system comprising a plurality of anchor nodes used to determine tag positions within a localization area using radio technology, the measurement device comprising:
at least one odometry sensor and a localization tag configured to communicate with the plurality of anchor nodes using the radio technology, the measurement device being configured to:
perform, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area;
estimate locations of the plurality of anchor nodes based on the respective first distances determined by the first ranging measurements and the respective first positions estimated by the first odometry measurements, estimating the locations of the plurality of anchor nodes includes:
executing at least two location estimation algorithms having different characteristics with regard to error robustness; and
combining the results of the at least two location estimation algorithms; and
provide the respective first distances determined by the first ranging measurements and the respective first positions estimated by the first odometry measurements to a configuration component for calibration of the positioning system; and
the at least two location estimation algorithms comprising a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements.

11. A configuration component for supporting calibration of a positioning system comprising:
a plurality of anchor nodes used to determine tag positions within a localization area using radio technology, the configuration component being configured to:
obtain, from a measurement device, respective first distances from the measurement device to the plurality of anchor nodes determined by first ranging measurements performed by the measurement device at a plurality of first measurement points in the localization area using a localization tag of the measurement device, and respective first positions of the measurement device in the localization area estimated by first odometry measurements performed by the measurement device at the plurality of first measurement points using at least one odometry sensor of the measurement device;
estimate locations of the plurality of anchor nodes based on the respective first distances determined by the first ranging measurements and the respective first positions estimated by the first odometry measurements, estimating the locations of the plurality of anchor nodes including:
executing at least two location estimation algorithms having different characteristics with regard to error robustness; and
combining the results of the at least two location estimation algorithms; and
configure the positioning system with the estimated locations of the plurality of anchor nodes to calibrate the positioning system; and
the at least two location estimation algorithms comprising a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements.

12. The configuration component of claim 11, wherein estimating the locations of the plurality of anchor nodes includes compensating drifts in the respective first positions estimated by the first odometry measurements.

13. The configuration component of claim 11, wherein compensating the drifts in the respective first positions estimated by the first odometry measurements includes at least one of rotating and scaling the respective first positions with respect to at least one known landmark position.

14. The configuration component of claim 11, wherein a location of an anchor node is estimated by determining a cluster head that is closest to the calculated crosspoints.

15. The configuration component of claim 11, wherein the crosspoint based algorithm further includes filtering out crosspoints for which there are ranging measurements with a distance smaller than a distance between the respective crosspoint and a corresponding first position estimated by the first odometry measurements by a predetermined threshold.

16. The configuration component of claim 11, further configured to:
obtain, from the measurement device, respective second distances from the measurement device to the plurality of anchor nodes determined by second ranging measurements performed by the measurement device at a plurality of second measurement points in the localization area using the localization tag of the measurement device with respect to the plurality of anchor nodes, and respective second positions of the measurement device in the localization area estimated by second odometry measurements performed by the measurement device at the plurality of second measurement points using at least one odometry sensor of the measurement device; and
validate the estimated locations of the plurality of anchor nodes based on the second distances determined by the second ranging measurements and the second positions estimated by the second odometry measurements.

17. The configuration component of claim 16, wherein validating the estimated locations of the plurality of anchor nodes is performed considering at least one of:
a number of undershoot measurements corresponding to a number of times one of the second distances is smaller than a distance between the associated second position and the estimated location of the corresponding anchor node being validated;
a number of line of sight measurements corresponding to a number of times one of the second distances coincides with a distance between the associated second position and the estimated location of the corresponding anchor node being validated; and
an angular distribution of the line of sight measurements in space.

18. A system comprising:
a measurement device for supporting calibration of a positioning system comprising a plurality of anchor nodes used to determine tag positions within a localization area using radio technology, the measurement device, the measurement device comprising:
at least one odometry sensor and a localization tag configured to communicate with the plurality of anchor nodes using the radio technology, the measurement device being configured to:
perform, at a plurality of first measurement points in the localization area using the localization tag, first ranging measurements with respect to the plurality of anchor nodes using the radio technology to determine respective first distances from the measurement device to the plurality of anchor nodes and performing, at the plurality of first measurement points using the at least one odometry sensor, first odometry measurements to estimate respective first positions of the measurement device in the localization area;
estimate locations of the plurality of anchor nodes based on the respective first distances determined by the first ranging measurements and the respective first positions estimated by the first odometry measurements, estimating the locations of the plurality of anchor nodes includes:
executing at least two location estimation algorithms having different characteristics with regard to error robustness; and
combining the results of the at least two location estimation algorithms; and
provide the respective first distances determined by the first ranging measurements and the respective first positions estimated by the first odometry measurements to a configuration component for calibration of the positioning system; and
the configuration component comprising:
a plurality of anchor nodes used to determine tag positions within a localization area using radio technology, the configuration component being configured to:
obtain, from a measurement device, respective first distances from the measurement device to the plurality of anchor nodes determined by first ranging measurements performed by the measurement device at a plurality of first measurement points in the localization area using a localization tag of the measurement device, and respective first positions of the measurement device in the localization area estimated by first odometry measurements performed by the measurement device at the plurality of first measurement points using at least one odometry sensor of the measurement device;
estimate locations of the plurality of anchor nodes based on the respective first distances determined by the first ranging measurements and the respective first positions estimated by the first odometry measurements, estimating the locations of the plurality of anchor nodes including:
executing the at least two location estimation algorithms having different characteristics with regard to error robustness; and
combining the results of the at least two location estimation algorithms; and
configure the positioning system with the estimated locations of the plurality of anchor nodes to calibrate the positioning system; and
the at least two location estimation algorithms comprising a crosspoint based algorithm which includes calculating crosspoints of spheres as candidate locations of anchor nodes, the spheres having centers corresponding to the first positions estimated by the first odometry measurements and having radii corresponding to the associated first distances determined by the first ranging measurements.

* * * * *